United States Patent

Isomura et al.

[19]

[11] Patent Number: 5,960,749
[45] Date of Patent: Oct. 5, 1999

[54] TWO-CYCLE INTERNAL COMBUSTION ENGINE

[75] Inventors: Shinichi Isomura; Masahiro Asai; Masashi Amano, all of Saitama, Japan

[73] Assignee: Honda Giken Kogyo Kabushiki Kaisha, Tokyo, Japan

[21] Appl. No.: 08/940,029

[22] Filed: Sep. 29, 1997

[30] Foreign Application Priority Data

May 24, 1997 [JP] Japan .................................... 9-150378

[51] Int. Cl.⁶ .............................. F02B 21/02; F02B 29/06
[52] U.S. Cl. ................. 123/48 D; 123/73 C; 123/65 V; 123/65 P; 123/316
[58] Field of Search ............................ 123/65 PE, 65 SP, 123/73 C, 73 D, 48 D, 65 A, 65 P, 65 V, 65 VC, 316, 73 PP

[56] References Cited

U.S. PATENT DOCUMENTS

| | | | |
|---|---|---|---|
| 1,594,664 | 8/1926 | Congellier | 123/316 |
| 1,722,951 | 7/1929 | Barkeij | 123/316 |
| 2,796,054 | 6/1957 | Miller | 123/316 |
| 4,753,198 | 6/1988 | Heath | 123/316 |
| 5,025,769 | 6/1991 | Plohberger et al. | 123/316 |
| 5,048,473 | 9/1991 | Curtil | 123/65 A |
| 5,095,881 | 3/1992 | Nishimura et al. | 123/316 |

FOREIGN PATENT DOCUMENTS

| | | |
|---|---|---|
| A3-100318 | 4/1991 | Japan . |
| A5-502521 | 11/1993 | Japan . |
| 144545 | 6/1997 | Japan . |

Primary Examiner—Willis R. Wolfe
Assistant Examiner—Brian J. Hairston
Attorney, Agent, or Firm—Birch, Stewart, Kolasch & Birch, LLP

[57] ABSTRACT

A control valve is disposed in a communication passage for communication between a combustion chamber and a chamber portion adjacent to the combustion chamber, and through the communication passage at least one of a fuel and an air-fuel mixture, and a highly compressed gas, are supplied or charged into the combustion chamber and the chamber portion adjacent thereto, respectively. The control valve includes a first control valve disposed in the first communication passage and a second control valve disposed in the second communication passage, the first control valve causes the first communication passage to open at a timing near closing of an exhaust port and causes it to close halfway in a compression stroke. The second control valve causes the second communication passage to open at a timing near closing of the scavenging ports and causes it to close prior to closing of the first communication passage.

8 Claims, 8 Drawing Sheets

ND COMBUSTION
TWO-CYCLE INTERNAL COMBUSTION ENGINE

BACKGROUND OF THE INVENTION

1. Field of the Invention

The present invention relates to a two-cycle internal combustion engine capable of preventing blow-by of an air-fuel mixture in an internal combustion engine and thereby enhancing the combustion stability, fuel economy and exhaust purifying performance. More particularly, the invention is concerned with a two-cycle internal combustion engine wherein in a communication passage between a combustion chamber and a chamber portion adjacent thereto is disposed a control valve for controlling the communication passage to open and close the same passage, and through the communication passage a fuel or an air-fuel mixture is supplied or charged into the combustion chamber and a highly compressed gas is supplied or charged into the chamber portion. In particular, the shape and position of the communication passage and the control valve are optimized to render the communication passage and the control valve more effective.

2. Description of Background Art

In the conventional two-cycle internal combustion engine, fuel supplied from a carburetor is mixed with intake air. The resulting mixture is introduced into a crank chamber and is thereafter supplied into a combustion chamber through a scavenging port. An opening timing of an exhaust port is set earlier than that of the scavenging port (the upper edge of the exhaust port is higher than that of the scavenging port), so that as the air-fuel mixture fed into the combustion chamber is discharged to an exhaust passage, thus, a so-called blow-by is apt to occur.

The blow-by is suppressed by an exhaust pulsating effect of the exhaust chamber, but throughout the whole operation area it is difficult to effect such suppression. This difficulty exerts an influence on both fuel economy and exhaust purifying performance.

In an effort to solve this problem, a two-cycle internal combustion engine, as disclosed in Japanese Patent Laid Open Nos.100318/91 and 302521/93, has been proposed.

In the two-cycle internal combustion engine disclosed in the patent laid open No.100318/91, a high pressure chamber is connected to a crank chamber through a check valve, the high-pressure chamber and a combustion chamber are connected with each other through an air passage. A solenoid valve is disposed at the lower end of the air passage, while at the upper end of the air passage is disposed a fuel injection valve capable of injecting fuel into the combustion chamber.

In the two-cycle internal combustion engine disclosed in Japanese patent laid open No.302521/93, a chamber is formed adjacent both the crank case and cylinder block. An intake control valve is disposed between a crank chamber and said chamber. A scavenging control valve is disposed between the chamber and a combustion chamber in a cylinder. In addition, a fuel injection valve is provided for injecting fuel into the said chamber.

In the two-cycle internal combustion engine disclosed in the patent laid open No.100318/91, however, since a fuel supply port is formed in the side wall of the cylinder and the fuel injection valve is located perpendicularly toward the port, the fuel spray strikes against the cylinder wall on the exhaust port side and is apt to adhere thereto.

If the spray timing is quickened so as not to cause interference of the fuel spray with the piston, blow-by of the fuel spray to the exhaust port is apt to occur. Conversely, if the port for the supply of fuel is formed at a high position for delaying the spray timing, the fuel injection valve is exposed to high temperature combustion gas and is thus required to have a high heat resistance.

In the two-cycle internal combustion engine disclosed in the patent laid open No.302521/93, since the air-fuel mixture injected from the scavenging control valve is fed into the combustion chamber through all of scavenging ports, blow-by of the mixture from the exhaust port is unavoidable.

The Assignee of the present invention has previously filed Japanese Patent Application No. 269366/96 for a two-cycle internal combustion engine solving the above-mentioned problems of the prior art.

According to the Application No. 269366/96, in a two-cycle internal combustion engine wherein a control valve for controlling the communication passage to open and close the same passage is positioned in a communication passage between a combustion chamber and a chamber formed sideways of the combustion chamber and connected to a fuel injection device. Through the communication passage fuel is supplied or charged into the combustion chamber, while a highly compressed gas is supplied or charged into the chamber formed sideways of the combustion chamber. The communication passage includes a first communication passage through which the highly compressed gas flows from the combustion chamber to the chamber formed sideways of the combustion chamber and a second communication passage through which an air-fuel mixture flows from the chamber to the combustion chamber. The control valve includes a first control valve disposed in the first communication passage and a second control valve disposed in the second communication passage. The first control valve causes the first communication passage to open at a timing near closing of an exhaust port and causes it to close halfway in a compression stroke, while the second control valve causes the second communication passage to open at a timing near closing of a scavenging port and causes it to close before closing of the first communication passage.

Since the above two-cycle internal combustion engine filed by the Assignee of the present invention is constructed as above, scavenging with air alone is performed at the initial stage of scavenging, whereby the blow-by, namely passage of the air-fuel mixture as it moves through the combustion chamber and discharge thereof to the exhaust passage, is prevented. Besides, the fuel (rich mixture) fed into the combustion chamber is mixed with the air into a mixture of an appropriate concentration within the combustion chamber because the interior of the same chamber has been scavenged sufficiently with the air, thus, affording a satisfactory combustion. Consequently, a high level of fuel economy and a high exhaust purifying performance can be attained.

Moreover, since the charging of the highly compressed gas into the chamber formed sideways of the combustion chamber is performed through the first communication passage from the combustion chamber in the compression stroke, an almost constant high pressure in the combustion chamber can be utilized for the charging of the gas. In comparison with the conventional gas charging which utilizes the internal pressure of the crank chamber, the drop of pressure caused by a full opening of the throttle valve with increases the number of revolutions of the engine is not influential at all, so there is obtained a more certain and stable, high chamber pressure (see FIGS. 9 and 10).

Further, since the highly compressed gas for creating a rich air-fuel mixture is obtained from the combustion chamber, the control valve (a rotary valve) disposed in the communication passage for communication between the combustion chamber and the chamber formed sideways of the combustion chamber can be mounted in the cylinder-wall located near the combustion chamber. As a result, the length of the communication passage between the control valve and a mixture injection port (a combustion chamber-side port of the second communication passage) can be shortened, whereby the amount of air required for moving the mixture through the communication passage can be decreased.

In addition, the time required for the fuel to move through the communication passage is shortened and the influence of the time factor on the setting of an opening timing of the control valve is diminished, so that it becomes easier to set the control valve opening timing, and the opening timing once set is easy to cover a wide range of engine revolutions.

Thus, the two-cycle internal combustion engine invention filed previously by the Assignee of the present invention can bring about various effects, but in order to make these effects more outstanding, there have still been points to be optimized with respect to the shape and position of the communication passage for communication between the combustion chamber and the chamber formed sideways of the combustion chamber, as well as the shape and position of the control valve disposed in the communication passage.

SUMMARY AND OBJECTS OF THE INVENTION

According to the present invention, in a two-cycle internal combustion engine a control valve is provided in a communication passage for communication between a combustion chamber and a chamber portion adjacent to the combustion chamber. The control valve controls the communication passage to open and close the same passage. A fuel or an air-fuel mixture is supplied or charged into the combustion chamber through the communication passage, while a highly compressed gas is supplied or charged into the chamber portion adjacent to the combustion chamber. The communication passage includes a first communication passage through which the highly compressed gas flows from the combustion chamber to the chamber portion adjacent to the combustion chamber and a second communication passage through which the air-fuel mixture flows from the chamber portion to the combustion chamber. The control valve comprises a first control valve disposed in the first communication passage and a second control valve disposed in the second communication passage, the first control valve causes the first communication passage to open at a timing near closing of an exhaust port and causes it to close halfway in a compression stroke. The second control valve causes the second communication passage to open at a timing near closing of a scavenging port and causes it close before the first communication passage is closed halfway in the compression stroke. The first and second communication passages are open on the combustion chamber side into a cylinder bore in such a manner that an upper-end position of the combustion chamber-side opening of the first communication passage is not lower than that of the combustion chamber-side opening of the second communication passage.

Since the present invention is constructed as above, the first communication passage is closed (the charging of the highly compressed gas is completed) by the first control valve after the second communication passage has been closed (the supply of the air-fuel mixture has been completed) by the second control valve. In this connection, the combustion chamber-side openings of those communication passages can also be brought into a closed state in the said sequence as the piston rises in the compression stroke. That is, the combustion chamber-side openings of the communication passages can be positioned as low as possible. Therefore, it is possible to maintain predetermined expansion ratio and thermal efficiency of the internal combustion engine.

According to the present invention, in a two-cycle internal combustion engine wherein in a communication passage for communication between a combustion chamber and a chamber portion adjacent to the combustion chamber a control valve is disposed for controlling the communication passage to open and close the passage. A fuel or an air-fuel mixture is supplied or charged into the combustion chamber through the communication passage, while a highly compressed gas is supplied or charged into the chamber portion adjacent to the combustion chamber. The communication passage includes a first communication passage through which the highly compressed gas flows from the combustion chamber to the chamber portion adjacent to the combustion chamber and a second communication passage through which the air-fuel mixture flows from the chamber portion to the combustion chamber. The control valve comprises a first control valve disposed in the first communication passage and a second control valve disposed in the second communication passage. The first control valve causes the first communication passage to open at a timing near closing of an exhaust port and causes it to close halfway in a compression stroke. The second control valve causes the second communication passage to open at a timing near closing of a scavenging port and causes it to close before the first communication passage is closed halfway in the compression stroke. The first and second communication passages are open on the combustion chamber side into a cylinder bore in such a manner that the position of the combustion chamber-side opening of the second communication passage is not closed with a piston at an initial stage of opening of the second communication passage made by the second control valve.

Since the present invention is constructed as above, the spray direction of the air-fuel mixture adjusted by the shape of the second communication passage extending from the control valve to the combustion chamber is not disturbed by the piston. As a result, satisfactory combustion and high fuel economy and exhaust purifying performance are obtained.

According to the present invention, in a two-cycle internal combustion engine wherein in a communication passage for communication between a combustion chamber and a chamber portion adjacent to the combustion chamber is disposed a control valve is disposed for controlling the communication passage to open and close the passage. A fuel or an air-fuel mixture is supplied or charged into the combustion chamber through the communication passage, while a highly compressed gas is supplied or charged into the chamber portion adjacent to the combustion chamber. The communication passage includes a first communication passage through which the highly compressed gas flows from the combustion chamber to the chamber portion adjacent to the combustion chamber and a second communication passage through which the air-fuel mixture flows from the chamber portion to the combustion chamber. The control valve includes a first control valve disposed in the first communication passage and a second control valve disposed in the second communication passage. The first control valve causes the first communication passage to open at a timing near closing of an exhaust port and causes it to close halfway in a compressing stroke. The second control valve causes the second communication passage to open at a timing near closing of a scavenging port and causes it to close before the first communication passage is closed halfway in the compression stroke. The product of the time of the highly compressed gas from the combustion chamber to the chamber portion adjacent thereto through the first communication passage, the pressure of the highly compressed gas and a sectional area of the first communication passage, and the product of the time of flow of the air-fuel mixture from the chamber portion to the combustion chamber through the second communication passage, the pressure of the air-fuel mixture and a sectional area of the second communication passage, are set almost equal to each other.

Since the present invention is constructed as above, even if the time for charging the highly compressed gas to the chamber portion is short, the highly compressed gas in an amount sufficient for supplying the air-fuel mixture into the combustion chamber is ensured over a wide revolutional range. Consequently, there are attained an appropriate fuel supply and a satisfactory spray of fuel, thus ensuring a satisfactory combustion.

Further, since the area of the combustion chamber side opening of the first communication passage and hence also the combustion chamber-side volume of the same passage can be set to minimum values required, it is possible to maintain predetermined expansion ratio and thermal efficiency of the internal combustion engine.

According to the invention, in a two-cycle internal combustion engine wherein in a communication passage for communication between a combustion chamber and a chamber portion adjacent to the combustion chamber a control valve is disposed for controlling the communication passage to open and close the passage. A fuel or an air-fuel mixture is supplied or charged into the combustion chamber through the communication passage, while a highly compressed gas is supplied or charged into the chamber portion adjacent to the combustion chamber. The communication passage includes a first communication passage through which the highly compressed gas flows from the combustion chamber to the chamber portion adjacent to the combustion chamber and a second communication passage through which the air-fuel mixture flows from the chamber portion to the combustion chamber. The control valve includes a first control valve disposed in the first communication passage and a second control valve disposed in the second communication passage. The first control valve causes the first communication passage to open at a timing near closing of an exhaust port and causes it to close halfway in a compression stroke, the second control valve causes the second communication passage to open at a timing near closing of a scavenging port and causes it to close before the first communication passage is closed halfway in the compression stroke. The timing at which the highly compressed gas is to be charged into the chamber portion and the timing at which the air-fuel mixture is to be fed into the combustion chamber, are set so as to include a mutually overlapping portion.

Since the present invention is constructed as above, even if the internal pressure of the cylinder (internal pressure of the combustion chamber) varies according to operating conditions of the internal combustion engine, the charging of the highly compressed gas and the supply of the air-fuel mixture are always feasible at a crank angle at which the internal pressure of the chamber portion adjacent to the combustion chamber and that of the cylinder are equal to each other. Therefore, the highly compressed gas in an amount necessary and sufficient to feed the air-fuel mixture into the combustion chamber is charged into the chamber portion efficiently, whereby an appropriate amount of the mixture is supplied efficiently into the combustion chamber.

By constructing the present invention, it becomes easy to fabricate the first and second control valves and constitute the associated control mechanism.

The present invention also attains the same effects as those obtained in the Japanese Patent Application No. 269366196 filed previously by the assignee of the present invention in addition to the effects described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The spark ignition type two-cycle internal combustion engine, indicated at 1, is mounted on a two wheeled motor vehicle, or a motorcycle, (not shown). In the internal combustion engine 1, a cylinder block 3 and a cylinder head 4 are stacked in this order on a crank case 2 and are integrally connected with each other.

A piston 6 is inserted into a cylinder bore 5 formed in the cylinder block 3. The piston 6 is mounted in a vertically slidable manner. The piston 6 and a crank shaft 8 are connected with each other through a connecting rod 7 so that the crank shaft 8 is rotated with a vertical movement of the piston 6.

An intake passage 10' extending from the rear to the front of the vehicle body' is connected to an intake passage 10 formed in the crank case 2. A throttle valve (not shown) and a reed valve 12 are disposed in series in the intake passage 10. The throttle valve is connected to a throttle grip (not shown) through connecting means (not shown) in such a manner that the opening of the throttle valve increases when the throttle grip is twisted in one direction.

In the crank case 2 and the cylinder block 3 are formed a total of five scavenging passages for the supply of air, of which four scavenging passages 14 and 15 are located two on the right side and two on the left side to provide communication between the upper portion of the cylinder bore 5 and a crank chamber 9, and one scavenging passage 42 is located at a rear position and is open below a mixture (fuel) supply port 34 and a highly compressed gas intake port 31 both to be described later. The 5 side end portions of the cylinder bore are open into the cylinder bore, as indicated at 16, 17 and 43. The scavenging passage 42 for the supply of air is directly contiguous to the intake passage 10 of the crank case 2 on a rear stream side of the reed valve 12.

An exhaust port 22 of an exhaust passage 21 on the cylinder bore 5 side extends up to a position higher than the ports 16, 17 and 43 of the scavenging passages 14, 15 and 42 and are opposed to the mixture supply port 34 and the highly compressed gas inlet port 31 both to be described later. An exhaust control valve 24 is disposed near the exhaust port 22 of the exhaust passage 21 to change the upper-edge height of the exhaust port 22, thereby making both the exhaust timing and the sectional area of the exhaust passage 21 variable.

A generally hemispherical combustion chamber 13 defined in the upper portion of the cylinder bore 5 is offset to the exhaust port 22, and a spark plug 23 is attached to the combustion chamber 13.

At a rear position of the vehicle body is formed a chamber 29 in an adjacent relation to the cylinder block 3 which is located sideways of the combustion chamber 13. A first communication passage (highly compressed gas passage) 30 and a second communication passage (mixture passage) 33 provide communication between the chamber 29 and the combustion chamber 13. A valve receiving hole 40 is formed halfway of both communication passages in which is rotatably fitted a rotary valve 36. By means of a transmission mechanism (not shown) the rotary valve 36 is rotated in a direction (clockwise in FIG. 1) opposite to and at the same speed as the crank shaft 8. A pulley 39 is mounted at one end of the rotary valve 36 with the transmission mechanism (not shown) entrained thereon (see FIG. 4).

Figure 5:
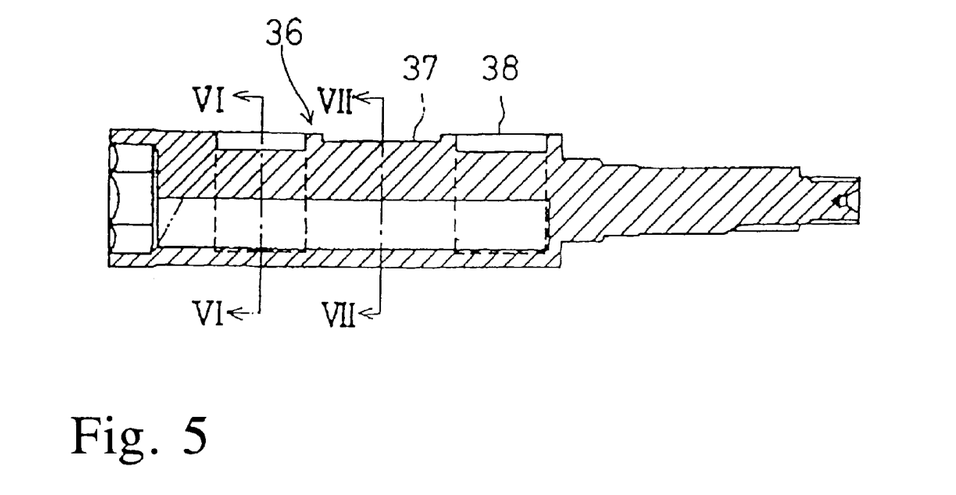
FIG. 5 is a longitudinal sectional view of a rotary valve used in the present invention.
Figure 6:
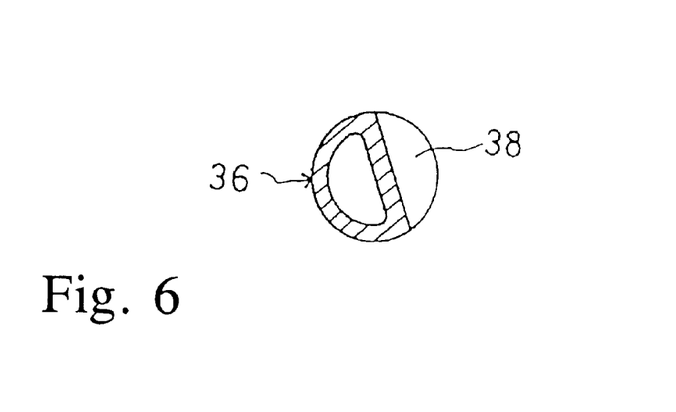
FIG. 6 is a sectional view taken on line VI—VI in FIG. 5.
Figure 7:
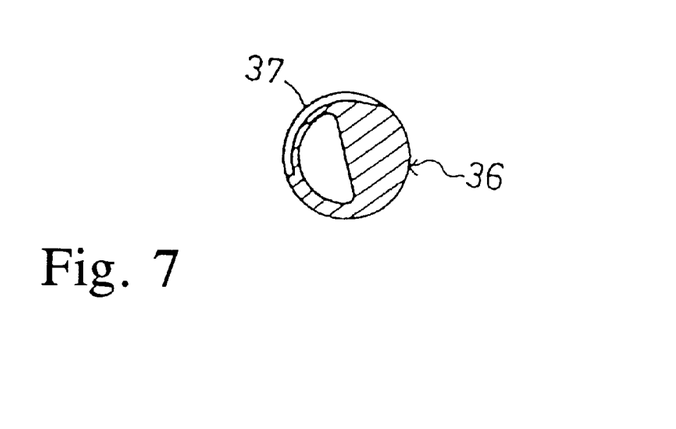
FIG. 7 is a sectional view taken on line VII—VII in FIG. 5.

Through the first communication passage 30 there flows a highly compassed gas from the combustion chamber 13 to the chamber 29. Through the second communication passage there flows an air-fuel mixture or a highly compressed gas before formation of the mixture from the chamber 29 to the combustion chamber 13. As shown in FIGS. 5 to 7, the flow of the highly compressed gas and that of the air-fuel mixture in both communication passages 30 and 33 are on-off controlled at predetermined timings by means of a first control valve (highly compressed gas charging control valve) 38 which is a constituent of the rotary valve 36 and which is disposed in the first communication passage 30 and a second control valve (mixture injection control valve) 37 which is also a constituent of the rotary valve 36 and which is disposed in the second communication passage 33.

Figure 4:
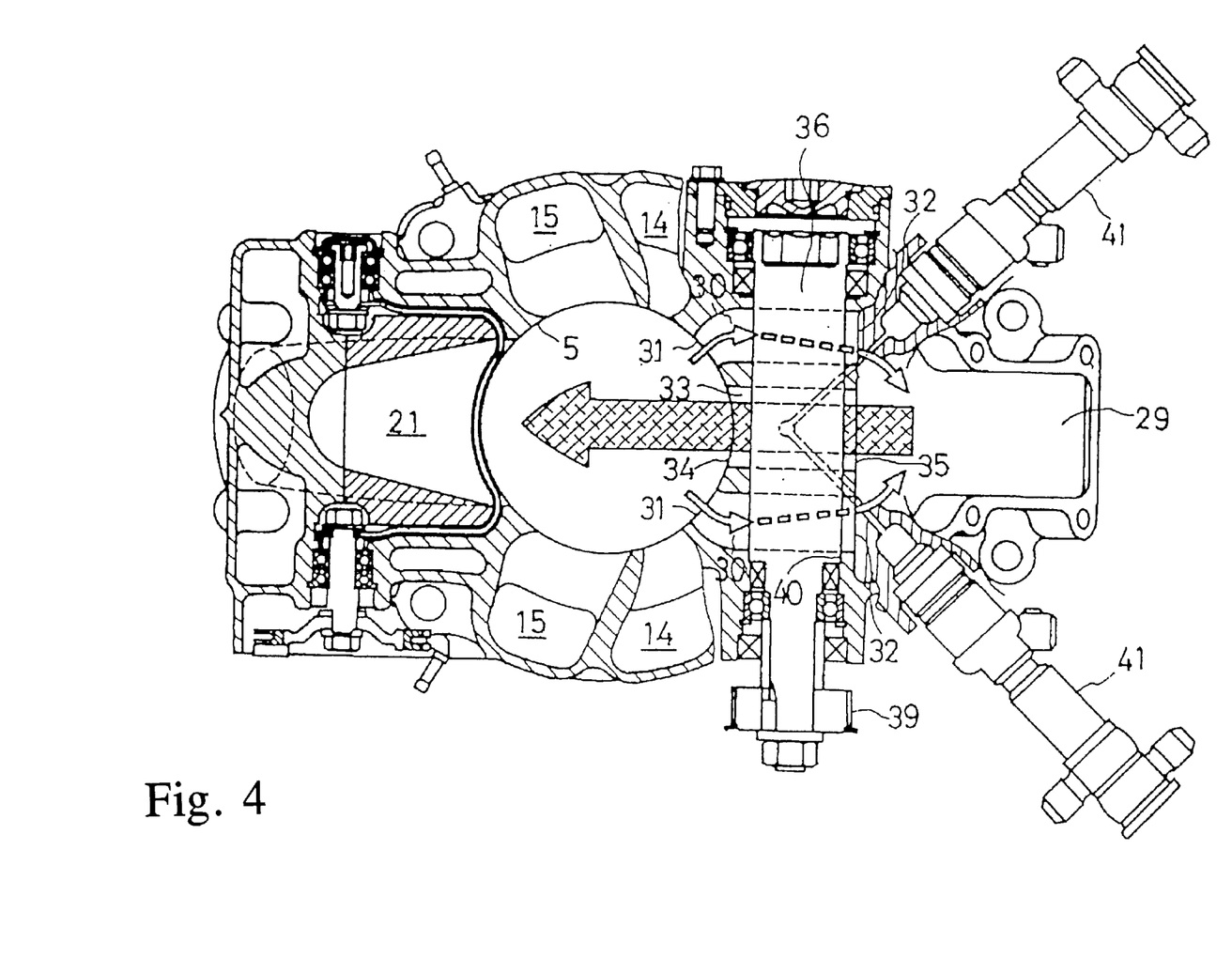
FIG. 4 is a transverse sectional view taken on line IV—IV in FIG. 1.

As shown in FIG. 4, the first communication passage 30 is formed in two right and left positions (upper and lower positions in the figure), and the first control valve 38 is disposed in each of the two right and left communication passages 30. Between the two communication passages 30 is located the second communication passage 33.

FIGS. 5 to 7 are sectional views of the rotary valve 36 wherein the first and second control valves 38,37 are arranged side by side. The first control valve 38 is formed by cutting off a rotary member as a constituent of the rotary valve 36 into a crescent shape which comprises an outer periphery of the rotary member and a straight line portion joining both ends of the circular arc. The second control valve 37 is formed as a cutout portion having a predetermined circumferential length and a predetermined depth. An end thereof is formed without any difference in height so that the spraying of the air-fuel mixture can be done rectilinearly and smoothly.

The shapes and a positional relation of the first communication passage 30, second communication passage 33, first control valve 38 and second control valve 37 are set as follows.

Figure 2:
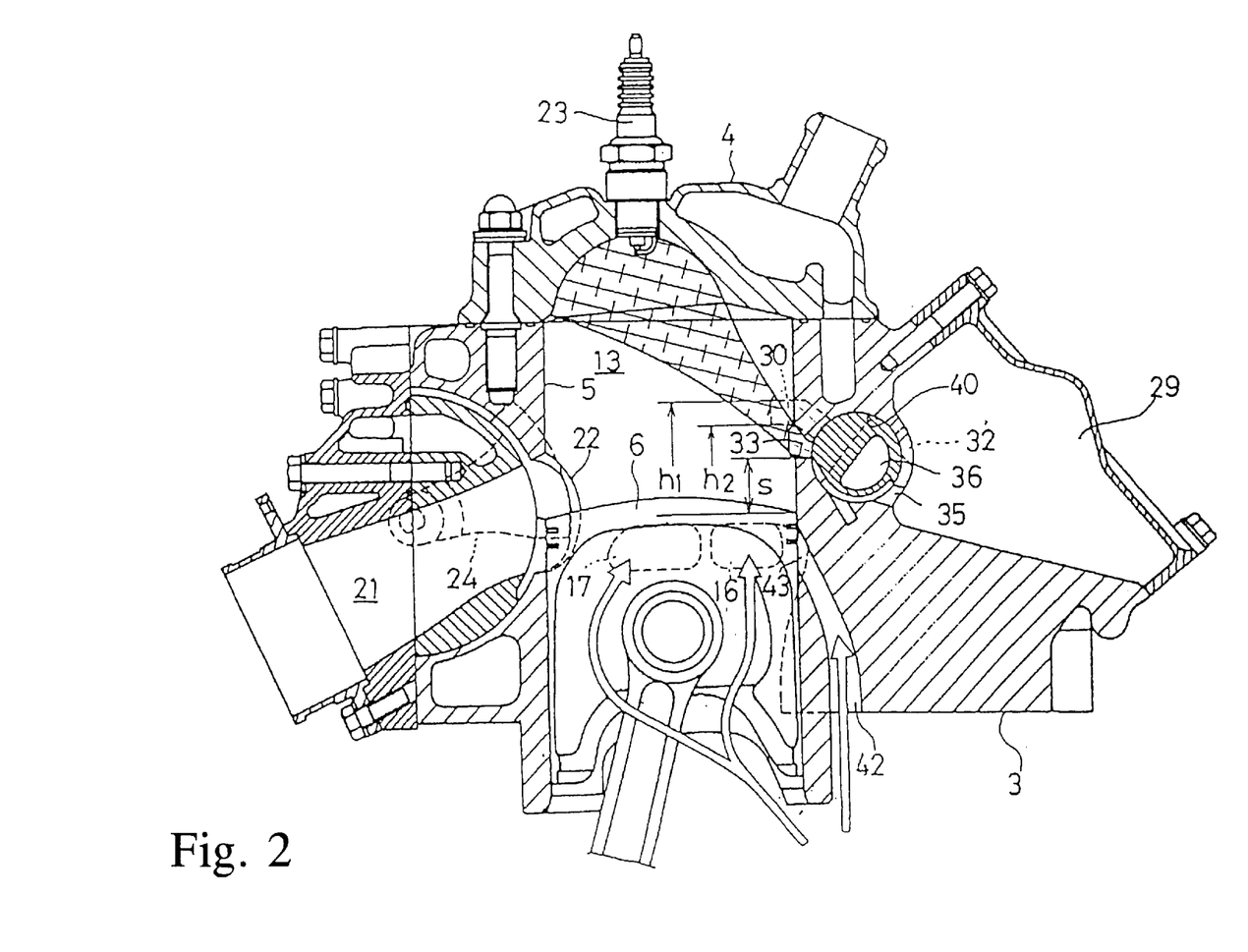
FIG. 2 is an enlarged view of a principal portion in FIG. 1.
Figure 3:
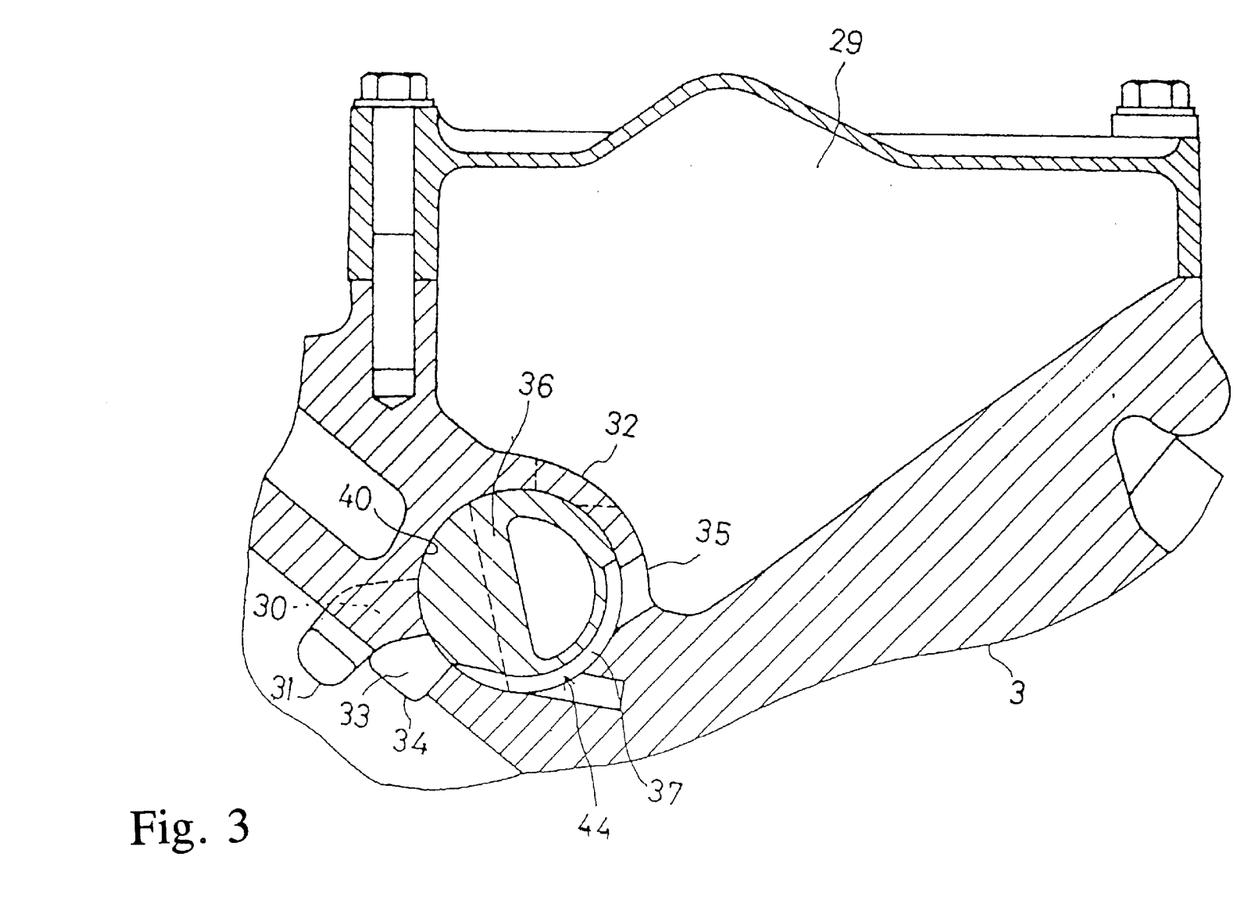
FIG. 3 is an enlarged view of another principal portion in FIG. 1.

An upper-end position $h_1$ of the highly compressed gas inlet port 31 as the combustion chamber 13—side opening of the first communication passage 30 is set high so as not to be lower than an upper-end position $h_2$ of the mixture supply port 34 as the combustion chamber 13—side opening of the second communication passage 33. The mixture supply port 34 is positioned to ensure a distance, s, (variable) between its lower end and the upper end of the outer periphery of the piston 6 so that the port 34 may not be closed by the piston at the initial stage of opening of the second communication passage 33 made by the second control valve 37 (see FIGS. 1 to 3).

Further, the product of a time of flow required for the highly compressed gas to flow from the combustion chamber 13 to the chamber 29 through the first communication passage 30, the pressure of the highly compressed gas and the area of the highly compressed gas inlet port 31, and the product of a time of flow required for the air-fuel mixture to flow from the chamber 29 to the combustion chamber 13 through the second communication passage 33, the pressure of the mixture and the area of the mixture supply port 34, are set almost equal to each other.

Open/close timing of the first control valve 38 and that of the second control valve 37 are determined as follows.

Figure 8:
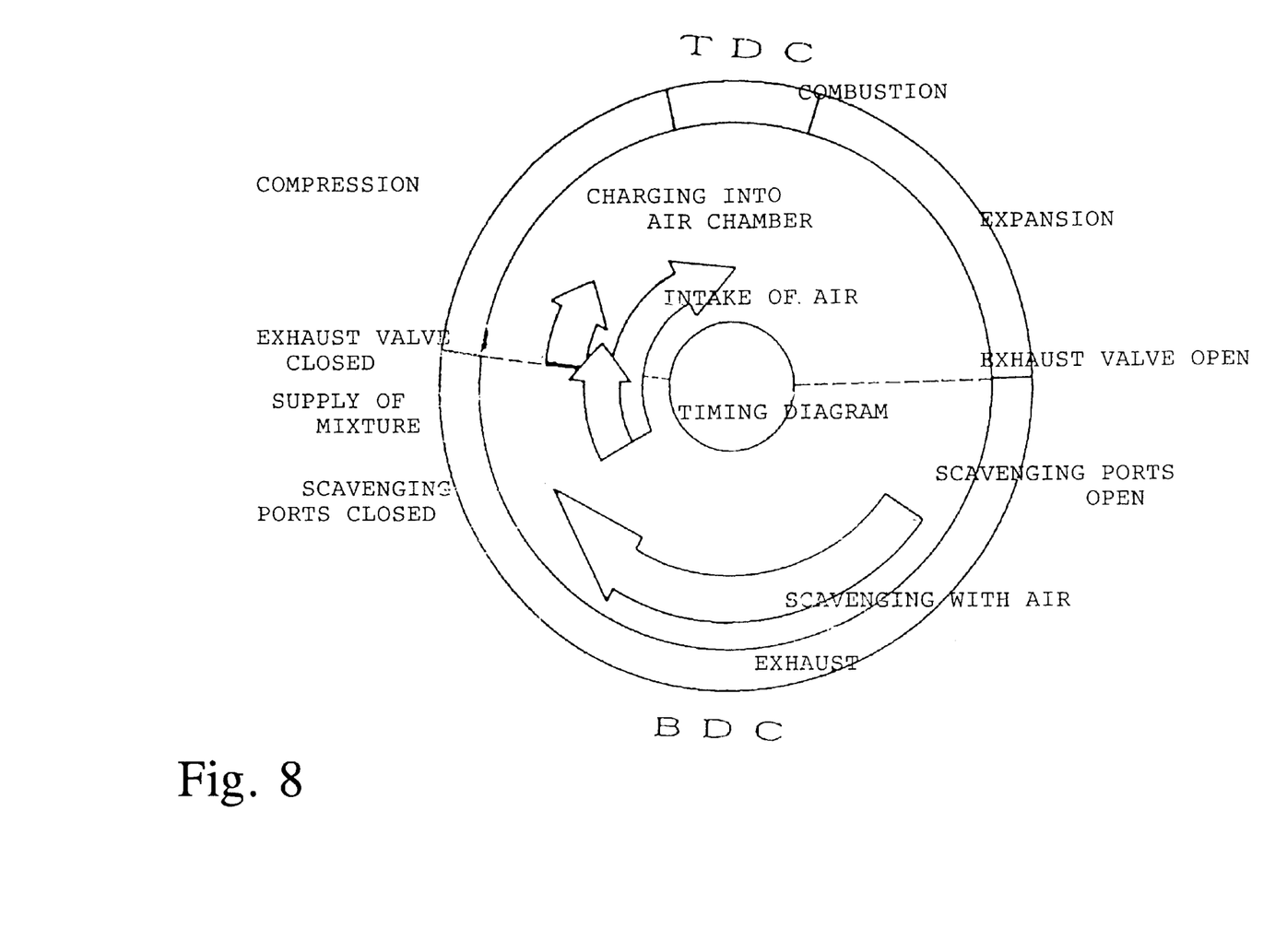
FIG. 8 is an explanatory diagram illustrating an operation cycle of the spark ignition type two-cycle internal combustion engine of the present invention.
Figure 9:
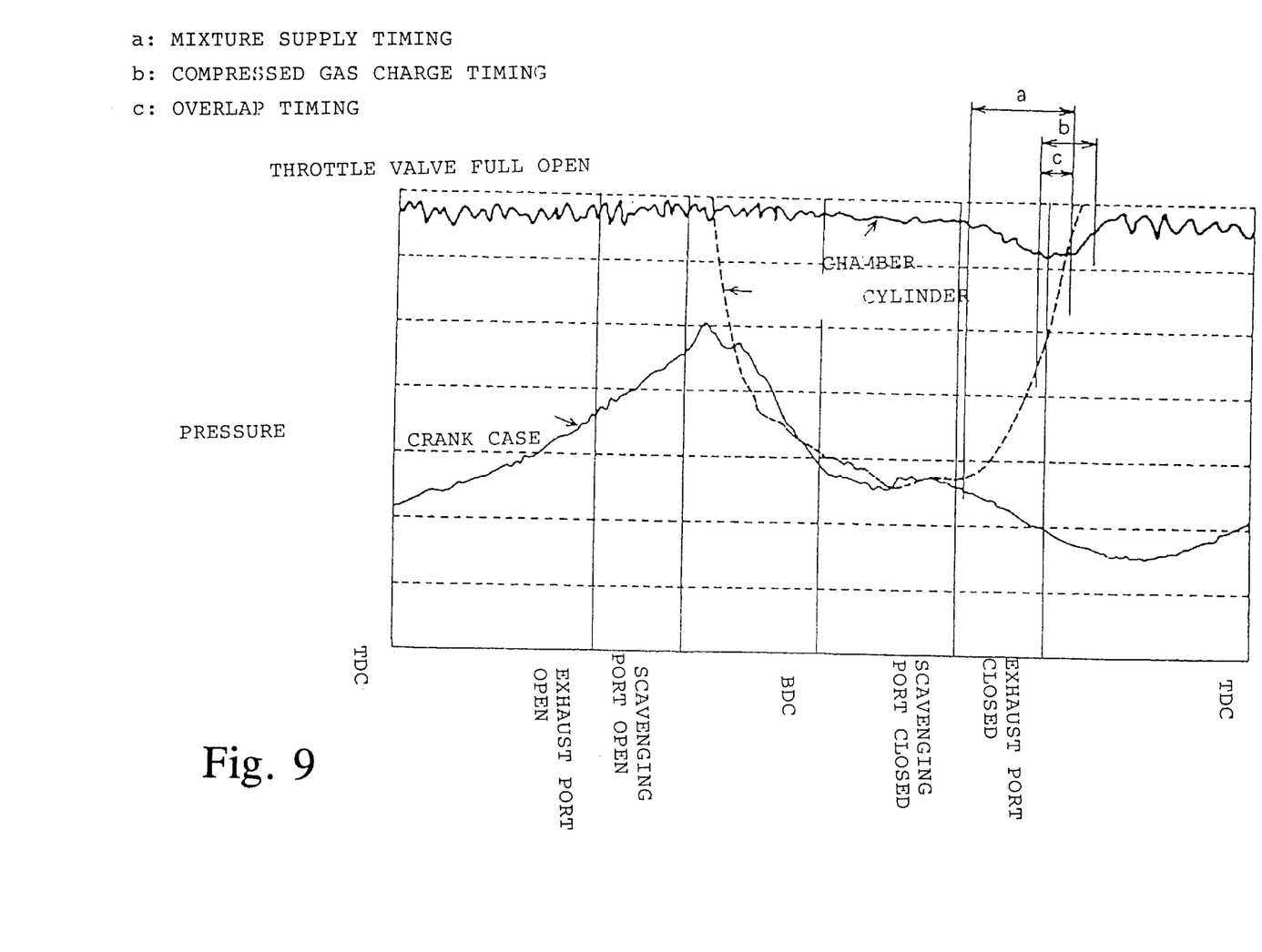
FIG. 9 is a diagram showing operation characteristics of the same engine.
Figure 10:
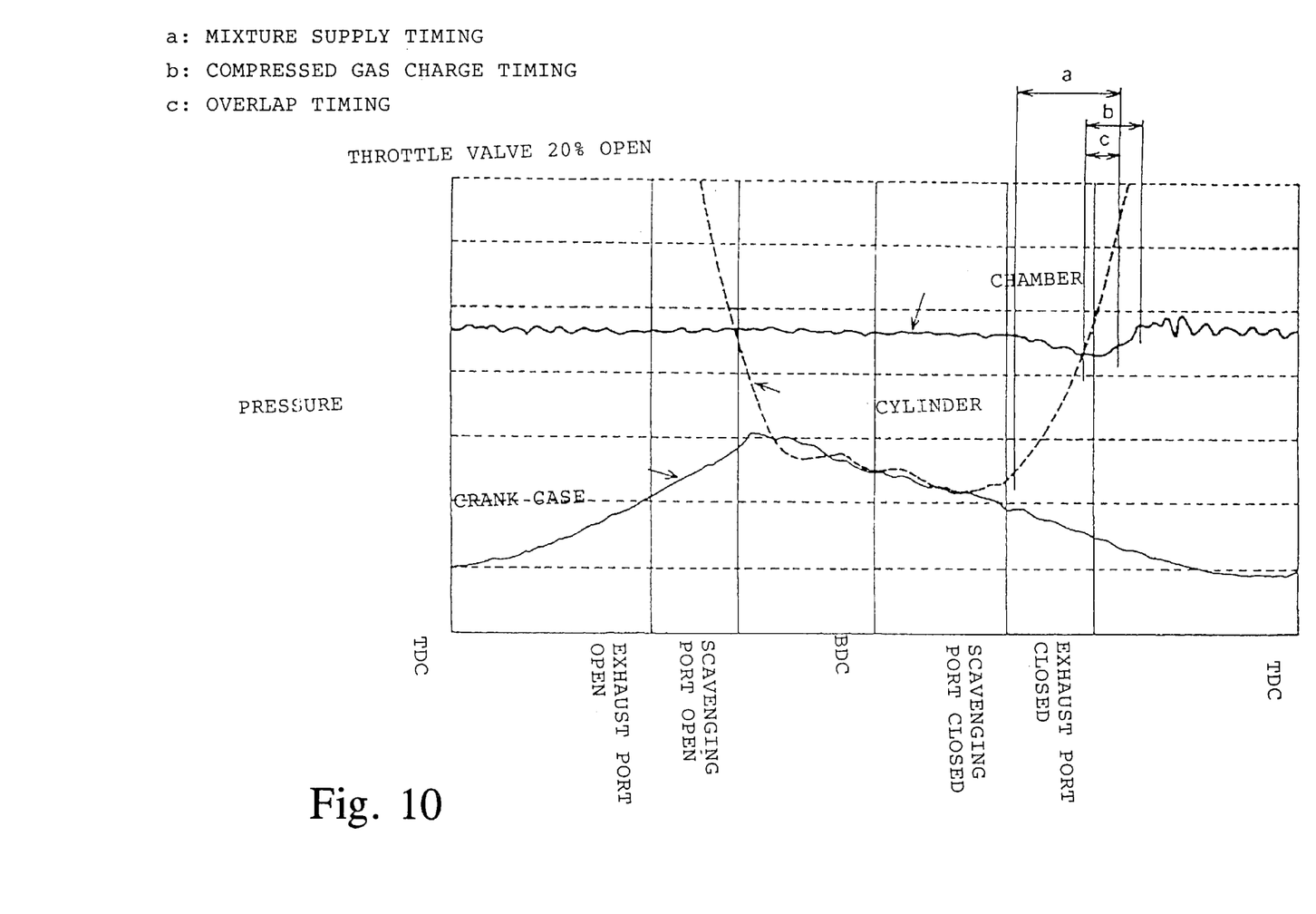
FIG. 10 is a diagram showing operation characteristics of the same engine in a different 20% open state.

Referring now to FIGS. 8 to 10, the first control valve 38 causes the first communication passage 30 to open at a timing near closing of the exhaust port 22 and causes it to open halfway in the compression stroke, while the highly compressed gas present in the combustion chamber 13 is introduced into the chamber 29 from the highly compressed gas inlet port 31 which faces the combustion chamber 13 (b in FIGS. 9 and 10). A chamber 29 side opening 32 of the first communication passage 30 is provided.

On the other hand, the second control valve 37 causes the second communication passage 33 to open at a timing near closing of the scavenging ports 16, 17 and 43 and causes it to close before the first communication passage 30 is closed halfway in the while the air-fuel mixture is injected into the combustion chamber 13 from the chamber 29 (a in FIGS. 9 and 10). Thus, the timing at which the highly compressed gas is to be charged into the chamber 29 and the timing at which the mixture is to be fed into the combustion chamber 13 are set so as to include a mutually overlapping portion (c in FIGS. 9 and 10).

The air-fuel mixture is formed in the following manner.

As shown in FIG. 4, fuel injection devices 41 symmetrically are mounted on the right and left of the cylinder block 3 on both right and left sides of the chamber 29. Just before the second control valve 37 causes the second communication passage 33 to open, the fuel injected from the fuel injection devices 41 is directed obliquely from below on both sides into a mixture forming space 44 (see FIG. 3) to which the cutout portion of the second control valve 37 faces. The jet position is approximately a central position of the second communication passage 33 in plan view, and in that position the chamber 29 is contiguous to the fuel injection devices 41 through a chamber 29 side opening 35 of the second communication passage 33 and the mixture forming space 44.

Then, when the second communication passage 33 is opened by the second control valve 37, the highly compressed gas in the chamber 29 flows through the opening 35 into the second communication passage 33, then is mixed with the fuel which has been standing by in the passage 33 and is carried by the high pressure in the chamber 29 while forming a mixture with the fuel, which mixture is then injected into the combustion chamber 13 from the mixture supply port 34.

The spark ignition type two-cycle internal combustion engine 1 illustrated in the drawings and constructed as above operates in the following manner.

Figure 1:
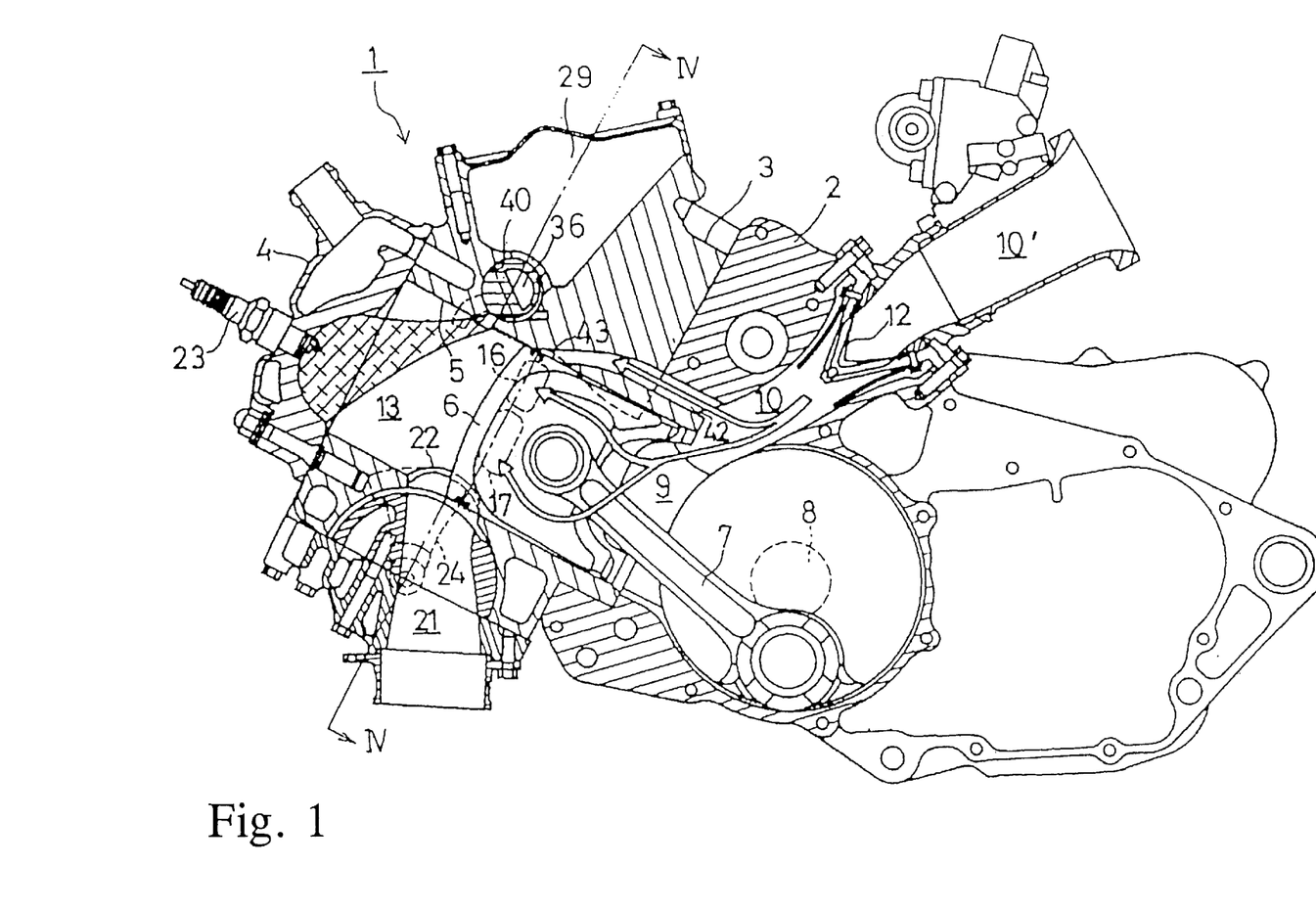
FIG. 1 is a longitudinal sectional view of a spark ignition type two-cycle internal combustion engine according to the present invention.

When the crank shaft 8 is rotated counterclockwise in FIG. 1 by means of a starter motor (not shown), the exhaust port 22 is closed by the piston 6 at a time point of 90° ahead of a top dead center (TDC) and the compression stroke starts, as shown in FIG. 8. Then, the first control valve 38 opens and causes the first communication passage 30 to open, whereby the highly compressed gas in the combustion chamber 13 is charged into the chamber 29 through the highly compressed gas inlet port 31, first communication passage 30 and opening 32.

Further, at a time point of 75° or so ahead of the top dead center (TDC) the mixture supply port 34 of the second communication passage 33 formed at the end portion of the same passage on the combustion chamber 13 side is closed by the piston 6 and thereafter the highly compressed gas inlet port 31 is closed by the piston 61. In this way the supply of the mixture to the combustion chamber 13 and the charging of the highly compressed gas to the chamber 29 are completed successively.

Further, the combustion chamber 13 is compressed and the spark plug 23 is ignited at predetermined timings ahead of the top dead center, while the crank chamber 9 continues to expand with an upward movement of the piston 6 and the intake of air is continued.

After the top dead center (TDC) has been reached, the mixture in the combustion chamber 13 burns and expands, and the crank chamber 9 is compressed with a downward movement of the piston 6, whereby the air present within the crank chamber is compressed.

Then, at a time point of 90° past the top dead center (TDC), which time point varies depending on a vertical position of the exhaust control valve 24), the exhaust port 22 is opened and the combustion gas is discharged from the exhaust passage 21.

Further, at a time point of about 122° past the top dead center (TDC), the scavenging ports 16, 17 and 43 are opened with a downward movement of the piston 6, so that the compressed air (not containing fuel) in the crank chamber 9 flows from the scavenging ports 16, 17 and 43 into the combustion chamber 13 through the scavenging passages 14, 15 and 42 for the supply of air, and the gas after combustion present in the combustion chamber 13 is pushed out toward the exhaust port 22. In this way there is performed scavenging with air alone. At the same time, fuel is injected into the mixture forming space 44 to which the cutout portion of the second control valve 37 faces, by means of the fuel injection devices 41.

Next, at a time point of about 58° past a bottom dead center (BDC) the scavenging ports 16, 17 and 43 are closed with an upward movement of the piston 6, resulting in the stopping of the scavenging performed with the air flowing into the combustion chamber from the scavenging ports 16, 17 and 43. Approximately from this point the second control valve 37 causes the second communication passage 33 to open, so that the mixture is injected into the combustion chamber 13 from the mixture supply port 34. At the same time, the crank chamber 9 expands as the piston 6 rises, and air is introduced into the crank chamber from the intake passage 10 through the reed valve 12. Blow-by of the mixture scarcely occurs in its injection.

Since the spark ignition type two-cycle internal combustion engine 1 of this embodiment is constructed and operates as above, it can attain the following effects.

In the internal combustion engine 1, scavenging is performed with air alone at the initial stage thereof, so that the direct passage of the air-fuel mixture through the combustion chamber 13 and discharge thereof to the exhaust passage 21, i.e., blow-by, is prevented, whereby both improvement of fuel economy and prevention of contamination of the atmosphere caused by unburnt gas can be attained.

Moreover, the mixture which is produced within the second communication passage 33 using the highly compressed gas charged into the chamber 29 and the fuel injected from the fuel injection device 41 is a rich mixture and this mixture flows into the combustion chamber 13 which has been scavenged thoroughly with fuel-free air past the scavenging passages 14, 15 and 42 for the supply of air. Consequently, the rich mixture becomes a mixture of an appropriate concentration, thus ensuring combustion to a satisfactory extent, whereby both a high level of fuel economy and a high exhaust purifying performance can be attained.

Further, since the upper-end position of the highly compressed gas inlet port 31 is set so as not to be lower than that of the mixture supply port 34, the first communication passage 30 is closed by the first control valve 38 (the charging of the highly compressed gas is completed after the second communication passage 33 has been completed). In this connection, the highly compressed gas inlet port 31 and the mixture supply port 34 can also be closed in this order as the piston rises in the compression stroke. Accordingly, the parts 31 and 34 can be positioned as low as possible, so that a predetermined expansion ratio and thermal efficiency of the internal combustion engine 1 can be substantially maintained.

It is here assumed that the upper-end position of the highly compressed gas inlet port 31 is set lower than that of the mixture supply port 34. Before the first communication passage 30 is closed by the first control valve 38, the upper-end position of the highly compressed gas inlet port 31 must be high enough so as not to block the flow of highly compressed gas flowing through the first communication passage 30. However, according to the above assumption, the upper-end position of the mixture supply port 34 as the combustion chamber-side opening of the second communication passage 33 which has already been closed prior to closing of the first communication passage 30 by the first control valve 38 is higher unnecessarily than the upper-end position of the highly compressed gas inlet port 31. It follows that as a whole the upper ends of the ports 31 and 34 are located at high positions. As a result, the expansion ratio of the internal combustion engine 1 is decreased and it is no longer possible to maintain the predetermined thermal efficiency of the engine 1.

The mixture supply port 34 is positioned while retaining a distance s (variable) so as not to be closed by the piston 6 at the initial stage of opening of the second communication passage 33 made by the second control valve 37. Therefore, the mixture spraying direction, which is adjusted by the shape of the second communication passage 33 extending from the second control valve 37 to the combustion chamber 13, is not disturbed by the piston 6. As a result, there are attained satisfactory combustion and high fuel economy and high exhaust purifying performance.

Further, the product of a flowing time required for the highly compressed gas to flow from the combustion chamber 13 to the chamber 29 through the first communication passage 30, the pressure of the highly compressed gas and the area of the highly compressed gas inlet port 31, and the product of a flowing time of the mixture from the chamber 29 to the combustion chamber 13 through the second communication passage 33, the pressure of the mixture and the area of the mixture supply port 34, are set so as to become almost equal to each other. Therefore, as is seen from FIGS. 8 to 10, even if the charging time of the highly compressed gas to the chamber 29 is short, the product of the above three is ensured by increasing the pressure of the highly compressed gas or of the highly compressed gas inlet port 31. As a result, the amount of the same gas charged into the chamber 29 almost matches the amount of the mixture supplied to the combustion chamber 13. Thus, the highly compressed gas in an amount sufficient to supply the mixture to the combustion chamber 13 is ensured in the chamber 29 over a wide rotation range, whereby appropriate fuel supply, satisfactory fuel spraying and satisfactory combustion are attained.

In this case, the time of flow and the and pressure of the fluids as well as the sectional areas of the flow passages are not always limited to the respective values at the positions of the combustion chamber-side ports 31 and 34 of the first and second communication passages 30, 33. Their values at the positions of the circumferential cutout portions of the first and second control valves 38, 37 may be selected, and in this case the same effects as above can be attained by forming the circumferential cutout portion of the first control valve 38 disposed in the first communication passage 30 deeper than the circumferential cutout portion of the second control valve 37 disposed in the second communication passage 33 (see FIGS. 6 and 7).

As noted above, moreover, the area of the highly compressed gas inlet port 31 and hence the volume of the first communication passage 30 on the combustion chamber 13 side can be set to a minimum required value by making both aforesaid products almost equal to each other. Accordingly, predetermined expansion ratio and thermal efficiency of the internal combustion engine 1 can be substantially maintained.

Further, since the highly compressed gas charging timing for the chamber 29 and the mixture supply timing for the combustion chamber 13 are set so as to include a mutually overlapping timing, even if the internal pressure of the cylinder (internal pressure of the combustion chamber 13) varies depending on operating conditions of the engine 1, both charging of the highly compressed gas and supply of the mixture can be done at a crank angle at which the pressure of the chamber 29 is equal to the internal pressure of the cylinder. Consequently, the highly compressed gas in an amount sufficient to carry the mixture into the combustion chamber 13 is charged efficiently to the chamber 29, and an appropriate amount of the mixture is supplied efficiently into the combustion chamber 13.

Further, since the first and second control valves 38, 37 are constituted as a rotary valve in which they are arranged side by side axially of a rotary member of the rotary valve and are integrally connected together at different phases, it is easy to fabricate those control valves and constitute the associated control mechanism.

Additionally, the spark ignition type two-cycle internal combustion engine 1 of this embodiment can attain the same effects as in the foregoing previous invention filed by the assignee of the present case.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a two-cycle internal combustion engine having a control valve disposed in a communication passage for communication between a combustion chamber and a chamber portion adjacent to said combustion chamber for controlling said communication passage to open and close the passage, and at least one of a fuel and an air-fuel mixture is supplied or charged into said combustion chamber through said communication passage, while a highly compressed gas is supplied or charged into said chamber portion adjacent to the combustion chamber, the improvement comprising:

a first communication passage formed in said communication passage through which the highly compressed gas flows from said combustion chamber to said chamber portion adjacent to the combustion chamber;

a second communication passage formed in said communication passage through which the air-fuel mixture flows from said chamber portion to the combustion chamber;

a first control valve disposed in said first communication passage;

a second control valve disposed in said second communication passage;

said first control valve controls said first communication passage to open said first communication passage at a timing near closing of an exhaust port and said first control valve to close said first communication passage halfway in a compression stroke;

said second control valve controls said second communication passage to open said second communication passage at a timing near closing of a scavenging port and causes said second communication passage to close before said first communication passage is closed halfway in the compression stroke; and said first and second communication passages are open on the combustion chamber side into a cylinder bore in such a manner that an upper-end position of the combustion chamber side opening of the first communication passage is not lower than that of the combustion chamber side opening of the second communication passage.

2. The two-cycle internal combustion engine according to claim 1, wherein said first control valve and said second control valve are arranged side by side in an axial direction of a rotary member and are integrally connected with each other to constitute a rotary valve.

3. In a two-cycle internal combustion engine having a control valve disposed in a communication passage for communication between a combustion chamber and a chamber portion adjacent to said combustion chamber for controlling said communication passage to open and close the passage, and at least one of a fuel and an air-fuel mixture is supplied or charged into said combustion chamber through said communication passage, while a highly compressed gas is supplied or charged into said chamber portion adjacent to the combustion chamber comprising:

a first communication passage formed in said communication passage through which the highly compressed gas flows from said combustion chamber to said chamber portion adjacent to the combustion chamber;

a second communication passage formed in said communication passage through which the air-fuel mixture flows from said chamber portion to the combustion chamber;

a first control valve disposed in said first communication passage;

a second control valve disposed in said second communication passage;

said first control valve controls said first communication passage to open at a timing near closing of an exhaust port and causes the first control valve to close halfway in a compression stroke;

said second control valve controls said second communication passage to open at a timing near closing of a scavenging port and causes it to close before said first communication passage is closed halfway in the compression stroke; and said first and second communication passages are open on the combustion chamber side into a cylinder bore in such a manner that the position of the combustion chamber side opening of the second communication passage is not closed with a piston at an initial stage of opening of the second communication passage made by said second control valve.

4. The two-cycle internal combustion engine according to claim 3, wherein said first control valve and said second control valve are arranged side by side in an axial direction of a rotary member and are integrally connected with each other to constitute a rotary valve.

5. In a two-cycle internal combustion engine having a control valve disposed in a communication passage for communication between a combustion chamber and a chamber portion adjacent to said combustion chamber for controlling said communication passage to open and close the passage, and at least one of a fuel and an air-fuel mixture is supplied or charged into said communication chamber through said communication passage, while a highly compressed gas is supplied or charged into said chamber portion adjacent to the combustion chamber comprising:

a first communication passage formed in said communication passage through which the highly compressed gas flows from said combustion chamber to said chamber portion adjacent to the combustion chamber;

a second communication passage formed in said communication passage through which the air-fuel mixture flows from said chamber portion to the combustion chamber;

a first control valve disposed in said first communication passage;

a second control valve disposed in said second communication passage;

said first control valve controls said first communication passage to open at a timing near closing of an exhaust port and causes it to close halfway in a compression stroke;

said second control valve controls said second communication passage to open at a timing near closing of a scavenging port and causes it close before said first communication passage is closed halfway in the compression stroke; and the product of a time of flow of the highly compressed gas from said combustion chamber to said chamber portion adjacent thereto through said first communication passage, the pressure of said highly compressed gas and a sectional area of the first communication passage, and the product of a time of flow of the air-fuel mixture from said chamber portion to the combustion chamber through said second communication passage, the pressure of the air-fuel mixture and a sectional area of the second communication passage, are set almost equal to each other.

6. The two-cycle internal combustion engine according to claim 5, wherein said first control valve and said second control valve are arranged side by side in an axial direction of a rotary member and are integrally connected with each other to constitute a rotary valve.

7. In a two-cycle internal combustion engine having a control valve disposed in a communication passage for communication between a combustion chamber and a chamber portion adjacent to said combustion chamber for controlling said communication passage to open and close the passage, and at least one of a fuel and an air-fuel mixture is supplied or charged into said combustion chamber through said communication passage, while a highly compressed gas is supplied or charged into said chamber portion adjacent to the combustion chamber comprising:

a first communication passage formed in said communication passage through which the highly compressed gas flows from said combustion chamber to said chamber portion adjacent to the combustion chamber;

a second communication passage formed in said communication passage through which the air-fuel mixture flows from said chamber portion to the combustion chamber;

a first control valve disposed in said first communication passage;

a second control valve disposed in said second communication passage;

said first control valve controls said first communication passage to open at a timing near closing of an exhaust port and causes the first control valve to close halfway in a compression stroke;

said second control valve causes said second communication passage to open at a timing near closing of a scavenging port and causes it to close before said first communication passage is closed halfway in the compression stroke; and the timing at which the highly compressed gas is to be charged into said chamber portion and the timing at which the air-fuel mixture is to be fed into said combustion chamber, are set so as to include a mutually overlapping portion.

8. The two-cycle internal combustion engine according to claim 7, wherein said first control valve and said second control valve are arranged side by side in an axial direction of a rotary member and are integrally connected with each other to constitute a rotary valve.

* * * * *